United States Patent
Ikeda et al.

(10) Patent No.: US 9,838,554 B2
(45) Date of Patent: Dec. 5, 2017

(54) IMAGE FORMING APPARATUS INCLUDING DISCHARGED DOCUMENT SENSOR DETECTING EXISTENCE OF DISCHARGED DOCUMENT

(71) Applicant: KYOCERA Document Solutions Inc., Osaka (JP)

(72) Inventors: Ayaka Ikeda, Osaka (JP); Akihiro Umenaga, Osaka (JP); Masaki Sanou, Osaka (JP); Satomi Murai, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/279,931

(22) Filed: Sep. 29, 2016

(65) Prior Publication Data
US 2017/0094070 A1   Mar. 30, 2017

(30) Foreign Application Priority Data
Sep. 30, 2015 (JP) .................................. 2015-194374

(51) Int. Cl.
*H04N 1/00* (2006.01)
*G03G 15/20* (2006.01)

(52) U.S. Cl.
CPC ....... *H04N 1/0057* (2013.01); *G03G 15/2028* (2013.01); *H04N 1/00631* (2013.01); *H04N 1/00795* (2013.01); *H04N 2201/0094* (2013.01)

(58) Field of Classification Search
CPC ............. H04N 1/00631; H04N 1/0057; H04N 1/00795; H04N 2201/0094; G03G 15/2028
See application file for complete search history.

(56) References Cited

U.S. PATENT DOCUMENTS 5,121,911 A * 6/1992 Yamazaki ............. B65H 20/22
270/58.13
2009/0099937 A1* 4/2009 Onishi ................. G06Q 20/209
705/24

FOREIGN PATENT DOCUMENTS

JP     2005-150980 A     6/2005
JP     2007171254 A *   7/2007

* cited by examiner

*Primary Examiner* — David Banh
(74) *Attorney, Agent, or Firm* — IP Business Solutions, LLC (57) ABSTRACT

An image forming apparatus includes: a document feed section; a document reading section; a discharged document sensor detecting the discharged document already read by the document reading section; an image storage section storing a document image obtained through the reading by the document reading section; an image formation section performing an image formation operation in which a toner image of the document image is formed on paper; a fixing section performing fixing processing of heating and pressurizing the paper on which the image has been formed to fix the toner image on the paper; and a control section, upon judgment, with reference to a signal of the discharged document sensor before image formation of a predefined number of pages of document images stored in the image storage section, that the discharged document exists, stopping the image formation of the predefined number of pages of document images.

8 Claims, 5 Drawing Sheets

IMAGE FORMING APPARATUS INCLUDING DISCHARGED DOCUMENT SENSOR DETECTING EXISTENCE OF DISCHARGED DOCUMENT

INCORPORATION BY REFERENCE

This application claims priority to Japanese Patent Application No. 2015-194374 filed on Sep. 30, 2015, the entire contents of which are incorporated by reference herein.

BACKGROUND

This disclosure relates to an image forming apparatus, and more specifically to a technology of preventing a failure to take out a document discharged from an automatic document feed device.

Upon copying of a document in an image forming apparatus such as a copier or a multifunction peripheral, a failure to take out the document may occur. For such a problem, disclosed is a technology of reading an image of a document and temporarily storing image data into a storage section, providing a display prompting document reception, and upon judgment that the document has been received, starting print processing at an image formation section and upon passage of a certain period of time without the document being received, notifying a terminal device that the document is being left.

SUMMARY

As one aspect of this disclosure, a technology obtained by further improving the technology described above will be suggested.

An image forming apparatus according to one aspect of this disclosure includes a document feed section, a document reading section, a discharged document sensor, an image storage section, an image formation section, a fixing section, and a control section.

The document feed section individually feeds loaded documents.

The document reading section optically reads an image of the document fed by the document feed section.

The discharged document sensor detects an existence of a discharged document already read by the document reading section.

The image storage section stores a document image obtained through the reading by the document reading section.

The image formation section performs an image formation operation in which a toner image of the document image stored in the image storage section is formed on paper.

The fixing section performs fixing processing of heating and pressurizing the paper on which the toner image has been formed by the images formation section to fix the toner image on the paper.

The control section, upon judgment with reference to a signal of the discharged document sensor that the discharged document exists at time of ending image formation of up to a predefined number of pages traced back from a last page of a plurality of number of pages of document images stored in the image storage section, stopping the image formation operation performed by the image formation section and causing the image formation section not to perform the image formation of the predefined number of pages of document images.

DETAILED DESCRIPTION

Figure 1:
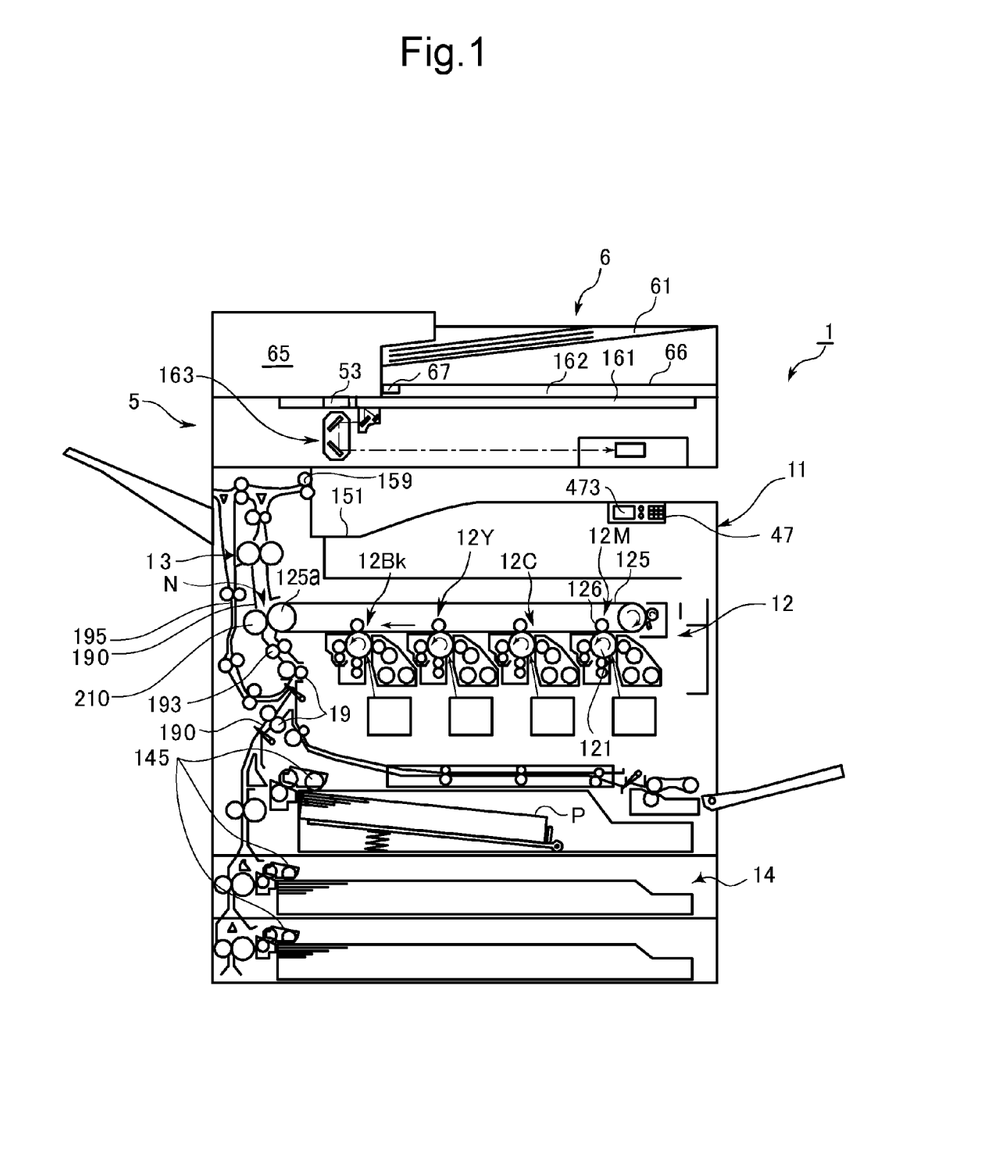
FIG. 1 is an elevational cross section showing a structure of an image forming apparatus according to one embodiment of this disclosure.

Hereinafter, an image forming apparatus according to one embodiment of this disclosure will be described with reference to the drawings. FIG. 1 is an elevational cross section showing a structure of the image forming apparatus according to one embodiment of this disclosure. The image forming apparatus 1 according to one embodiment of this disclosure is, for example, a multifunction peripheral combining together a plurality of functions such as a copy function, a printer function, a scanner function, and a facsimile function. The image forming apparatus 1 includes in an apparatus body 11: an operation section 47, an image formation section 12, a fixing section 13, a paper feed section 14, a document feed section 6, a document reading section 5, etc.

The operation section 47 receives, from a user, instructions such as an image formation operation execution instruction and a document reading operation execution instruction for various operations and processing executable by the image forming apparatus 1. The operation section 47 includes a display section 473.

The document reading section 5 includes: a contact glass 161 fitted to a top surface of the paper reading section 5; a document press cover 162 that presses a document loaded on the contact glass 161 in an openable and closeable manner; and a reading mechanism 163 that reads an image of the document loaded on the contact glass 161. The reading mechanism 163 optically reads the image of the document by using a charge coupled device (CCD).

The document feed section 6 is an ADF including: a document loading base 61 on which a document is loaded; a document discharge section 66 to which an image-read document is discharged; and a document conveyance mechanism 65. The document conveyance mechanism 65 includes: a paper feed roller, a conveyance roller, and a paper inversion mechanism, all not shown. The document conveyance mechanism 65, as a result of driving of the paper feed roller and the conveyance roller, individually takes out a plurality of documents loaded on the document loading base 61 and conveys the documents to a position opposing a document reading slit 53, through which reading by the reading mechanism 163 is enabled, and then the documents are discharged to the document discharge section 66.

A discharged sensor 67 that detects an existence of any discharged document already read by the document reading section 5 is provided at an appropriate portion of the document discharge section 66. As the discharged document sensor 67, a mechanical sensor can be used which includes an unillustrated lever, capable of making contact with a surface of the discharged document on a top surface of the document discharge section 66 and which detects the discharged document as a result of press-down of the lever. Alternatively, as the discharged document sensor 67, an optical sensor can be used which includes a light projector, not shown, irradiating light to a surface of the discharged document on the top surface of the document discharge section 66 and a light receiver, not shown, arranged closely thereto and which detects any discharged document as a result of the light reception by the light receiver.

Further, the document feed section 6 is provided in a manner such as to be rotatable with respect to the apparatus body 11 so that a front surface side of the document feed section 6 can move upwardly. The upward movement of the front surface side of the document feed section 6 to open a top surface of the contact glass 161 serving as a document base permits the user to load a document to be read, for example, a wide-open book on the top surface of the contact glass 161.

To perform a document reading operation by the image forming apparatus 1, the document reading section 5 optically reads an image of a document fed by the document feed section 6 or a document loaded on the contact glass 161 to thereby generate image data. The image data generated by the document reading section 5 is saved into, for example, a built-in HDD or a computer connected to the network.

To perform an image formation operation by the image forming apparatus 1, based on the image data generated through the document reading operation described above, the image data received from the computer connected to the network, or the image data stored in the built-in HDD, the image formation section 12 forms a toner image on paper P fed from the paper feed section 14.

For example, the image formation section 12 includes a photoconductive drum 121, a charging device, an LSU (Laser Scanning Unit), a developing device, a primary transfer roller 126, and a secondary transfer roller 210. The photoconductive drum 121 forms an electrostatic latent image on a circumferential surface thereof and a toner image along the electrostatic latent image. The charging device evenly charges the circumferential surface of each photoconductive drum 121. The exposure device is a so-called laser exposure device, which irradiates laser light, corresponding to each color based on the image data, to the already charged circumferential surface of the photoconductive drum 121 to form the electrostatic latent image on the circumferential surface of each photoconductive drum 121. The developing device supplies a toner to the electrostatic latent image on the circumferential surface of the photoconductive drum 121 to form a toner image on the circumferential surface of the photoconductive drum 121 in accordance with the image data.

In this embodiment, the image forming apparatus 1 performs image formation through such an electrophotographic process, but the electrophotographic process is just one example and the invention is not limited thereto, and the image forming apparatus 1 may perform image formation through ink jetting.

To perform color printing, a magenta image formation unit 12M, a cyan image formation unit 12C, a yellow image formation unit 12Y, and a black image formation unit 12Bk of the image formation section 12, based on an image composed of respective color components forming the image data described above, each form a toner image on the photoconductive drum 121 (an image carrier) through charging, exposure, and developing processes, and transfer the toner image onto an intermediate transfer belt 125 by the primary transfer roller 126.

The toner images of the respective colors transferred on the intermediate transfer belt 125 are superposed on each other on the intermediate transfer belt 125 through transfer timing adjustment, turning into a color toner image. The secondary transfer roller 210, at a nip part N formed with a driving roller 125*a* with the intermediate transfer belt 125 in between, transfers the color toner image formed on a surface of the intermediate transfer belt 125 onto paper P conveyed from the paper feed section 14 through a conveyance path 190. Then the fixing section 13 fixes the toner image on the paper P thereon through thermal compression. The paper P which has already been subjected to fixing processing and on which the color image has already been formed is discharged to a discharge tray 151.

The paper feed section 14 includes a plurality of paper feed cassettes. A control section 100 (controller) as shown graphically in FIG. 2 drives, into rotation, a pick up roller 145 of the paper feed cassette storing paper of a size specified by user's specification to convey the paper P stored in each paper feed cassette towards the nip part N described above. More specifically, the paper feed section 14 puts the paper P on standby at a registration roller 193 located immediately upstream of the nip part N. Then the paper feed section 14 delivers the paper P into the nip part N simultaneously with the toner image formation performed by the image formation section 12.

Figure 2:
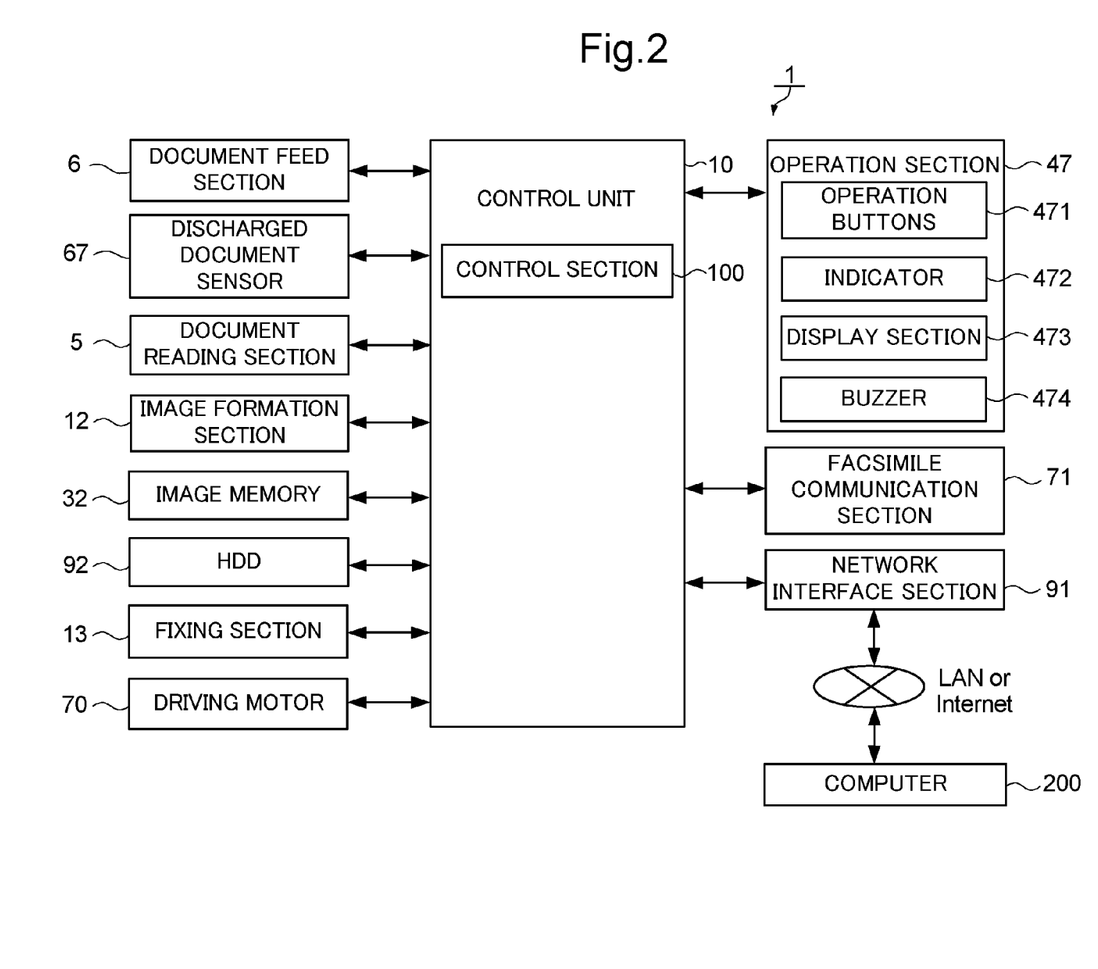
FIG. 2 is a functional block diagram showing main inner configuration of the image forming apparatus.

FIG. 2 is a functional block diagram showing main inner configuration of the image forming apparatus 1. The image forming apparatus 1 includes a control unit 10, the operation section 47, the document feed section 6, the discharged document sensor 67, the document reading section 5, an image memory 32, the image formation section 12, the fixing section 13, a driving motor 70, a facsimile communication section 71, a network interface section 91, an HDD 92, etc.

The document reading section 5 includes the reading mechanism 163 (FIG. 1) having a light irradiation section, a CCD sensor, etc. under control by the control section 100. The document reading section 5 irradiates a document with light by the light irradiation section and receives reflected light thereof with the CCD sensor to thereby read an image from the document.

The document feed section 6, in conjunction with the document reading operation performed by the document reading section 5, individually take out the documents loaded on the document loading base 61 (FIG. 1) and conveys the documents to a position opposing the document reading slit 53 (FIG. 1) of the document reading section 5. Any document already read is discharged to the document discharge section 66 (FIG. 1).

The discharged document sensor 67 detects the existence of any document discharged to the document discharge section 66.

The image memory 32 is a region where the document image obtained through reading by the document reading section 5 is temporarily stored and data targeted for printing at the image formation section 12 is temporarily saved.

The HDD 92 is a large-capacity storage device that stores, for example, the document image read by the document reading section 5.

The image memory 32 and the HDD 92 are each one example of an image storage section in the scope of the claims. To copy a large volume of documents, it takes a little time from when an image of the first document is read until when a toner image thereof is formed and transferred onto the paper P and is then further subjected fixing processing, during which the second document and those thereafter are sequentially read. The image memory 32 and the HDD 92 function as a buffer that absorbs time lug arising between document reading and printing of the read document image.

The operation section 47 includes: various operation buttons 471 including, for example, ten keys, a Start key, and a Clear key; various indicators 472 including, for example, an error and attention; the display section 473 of a touch-panel type that displays, for example, an operation guide to a user; and a buzzer 474 that generates an alarm sound. Note that the indicators 472 and the buzzer 474 are each one example of an alarm section in the scope of the claims.

The facsimile communication section 71 includes an encoding and decoding section, a modulation and demodulation section, and a network control unit (NCU), and performs facsimile transmission with a public phone line network.

The network interface section 91 is formed of a communication module such as a LAN board, and performs transmission and reception of various pieces of data to and from a computer 200 in a local area via, for example, a LAN connected to the network interface section 91.

The driving motor 70 is a driving source that provides a rotational driving force to, for example, various rotary members of the image formation section 12 and a conveyance roller pair 19.

The control unit 10 is composed of: a central processing unit (CPU), a RAM, a ROM, a dedicated hardware circuit; etc. The control unit 10 includes a control section 100.

The control section 100 is in charge of overall operation control of the image forming apparatus 1. The control section 100 is connected to the operation section 47, the document feed section 6, the discharged document sensor 67, the document reading section 5, the image memory 32, the image formation section 12, the fixing section 13, the driving motor 70, the facsimile communication section 71, the network interface section 91, the HDD 92, etc., and performs control of the aforementioned sections.

For example, upon judgement as a result of reference to the signal of the discharged document sensor 67 that the discharged document has been exists at time of ending of image formation of up to a predefined number of pages traced back from a last page of document image stored in the image memory 32, the control section 100 makes control of stopping the image formation operation performed by the image formation section 12 and not causing the image formation section 12 to perform image formation of the predefined number of pages of document images.

Next, a solution to prevent a failure to take out any document discharged to the document discharge section 66 upon document copying performed by using the document feed section 6 in the image forming apparatus 1 according to this embodiment will be described.

Figure 3:
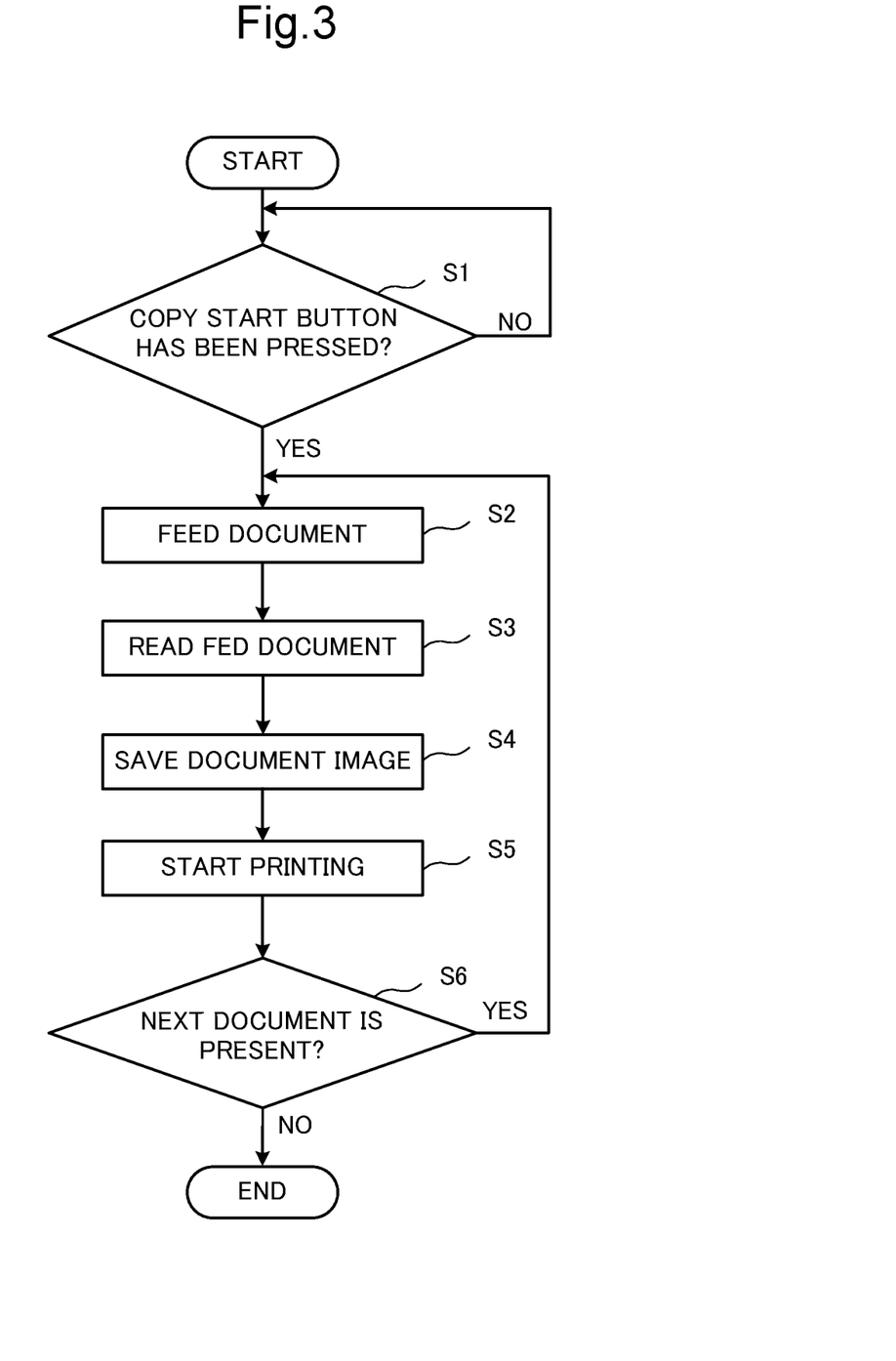
FIG. 3 is a flowchart showing processing performed upon copy operation using an automatic document feed device (ADF).

First, a copy operation performed by using the ADF (the document feed section 6) will be described. FIG. 3 is a flowchart showing processing performed upon the copy operation using the ADF.

The user loads a plurality of documents targeted for copying on the document loading base 61, and presses a copy start button, not shown, arranged at the operation section 47. Upon detection of the pressing of the copy start button (YES in S1), the control section 100 provides a document feed start instruction to the document feed section 6, which starts document feed in response to the provided instruction (S2).

The documents are individually fed from the document feed section 6. The document reading section 5 reads an image of the fed document (S3), and saves the document image into either or both of the image memory 32 and the HDD 92 (S4).

At a time point at which the first-page document image has been saved into either or both of the image memory 32 and the HDD 92, the control section 100 controls the paper feed section 14, the image formation section 12, and the fixing section 13 to start printing of document images from the first page document (S5). As described above, the control section 100 can start processing of printing the already read document image without waiting for completion of reading of all the documents. That is, the document reading operation and the document image printing processing can simultaneously be proceeded in parallel.

The document feed section 6 detects presence or absence of a next-page document on the document loading base 61, and feeds the next-page document when the next-page document is present (YES in S6) (S2). On the other hand, the document feed section 6 ends the document reading using the document feed section 6 when no next-page document is present (NO in S6).

Figure 4:
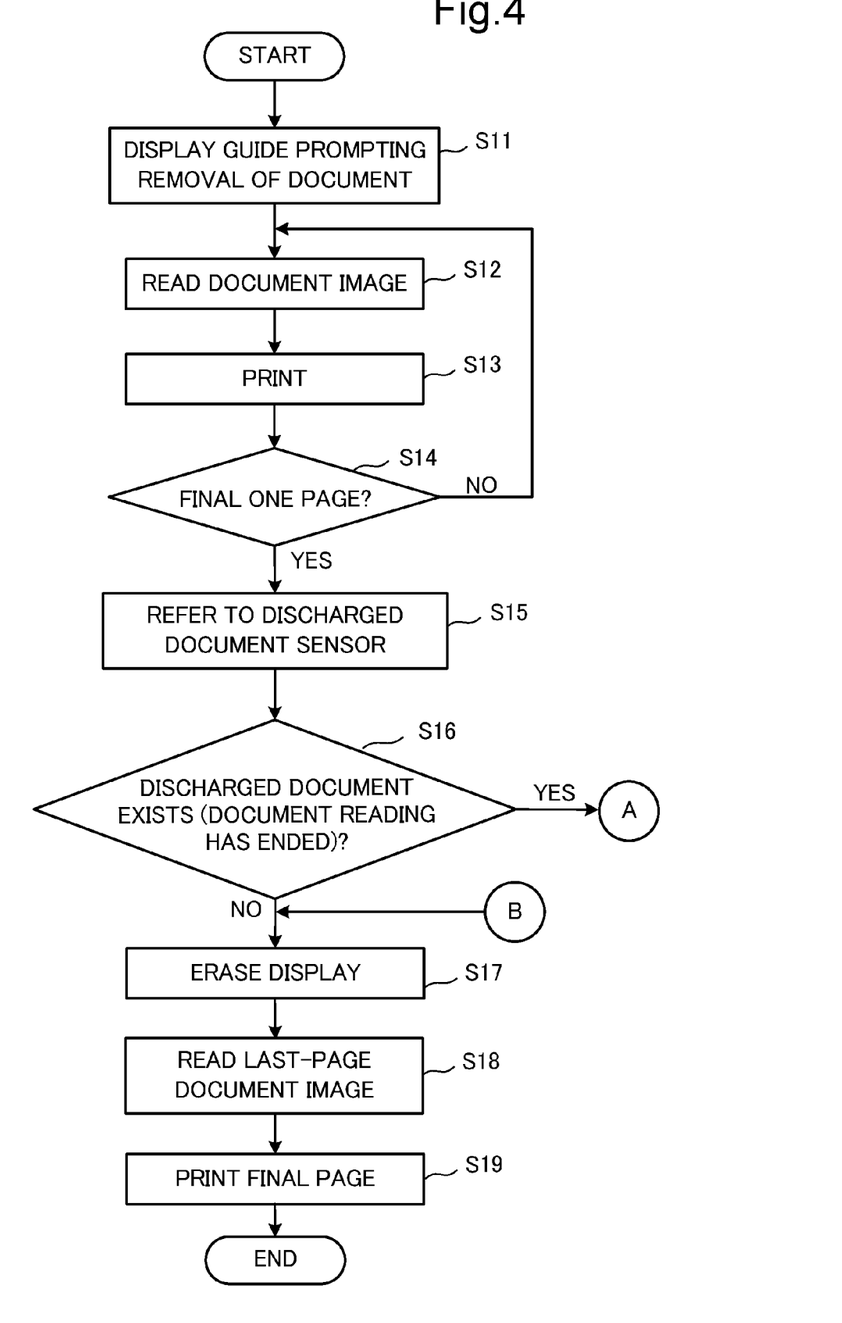
FIG. 4 is a flowchart showing processing performed upon printing operation performed following the copy operation using the ADF.

Next, a printing operation performed following the copy operation using the ADF will be described. FIG. 4 is a flowchart showing processing performed upon the printing operation following the copy operation using the ADF.

Upon start of the printing operation performed following the copy operation described above, the control section 100 displays, on the display section 473, a guide prompting document removal (S11). This causes the user who has viewed the display to take caution not to fail to take out the discharged document. This is a first action taken for the purpose of preventing the user from failing to take out the discharged document.

The control section 100 reads the document image from the image memory 32 and the HDD 92 (S12). The image formation section 12 forms a toner image of the read document image and transfers the toner image onto paper P, and the fixing section 13 performs fixing processing on the paper P on which the toner image has been transferred (S13).

The control section 100 confirms whether or not the document image just gone through the printing is the second-last-page document image. The "last page", that is, "one page corresponding to the last page" is one example of "a predefined number of pages traced back from the last page" described above.

When the document image just gone through the printing is not the second-last-page document image (NO in S14), the control section 100 reads a next-page document image and continues the printing processing. On the other hand, when the document image just gone through the printing is the second-last-page document image (YES in S14), the control section 100 refers to a signal of the discharged document sensor 67 (S15).

To copy a large volume of documents, it takes much time until completion of the copying. Thus, it is assumed that after setting the document on the ADF and pressing the copy start button, the user temporarily leaves the image forming apparatus 1 and then returns to the image forming apparatus 1 at around timing at which the document reading ends. At a time point at which the user returns to the image forming apparatus 1 or after a while therefrom, it is assumed that the document reading operation has completed and document image printing operation is in process. If the user removes the document discharged to the document discharge section 66 at such a time point, the discharged document sensor 67 does not detect the existence of the discharged document at a time point when the processing of printing the second-last-page document image ends (NO in S16). In this case, the control section 100 erases the display of the display section 473 (S17), and reads out the last-page document image from either or both of the image memory 32 and the HDD 92 (S18). The image formation section 12 forms a toner image of the last-page document image read out by the image formation section 12 and transfers the toner image onto the paper P, and the fixing section 13 performs fixing processing on the paper P on which the toner image has been transferred (S19). This ends the operation of printing the document image read out by using the ADF.

On the other hand, when the user does not remove the discharged document even after returning to the image forming apparatus 1, the discharged document sensor 67 detects the existence of the discharged document at a time point at which the processing of printing the second-last-page document image ends (YES in S16). In this case, the control section 100 stops the image formation of the last-page document image, and performs alarming to be described below.

Figure 5:
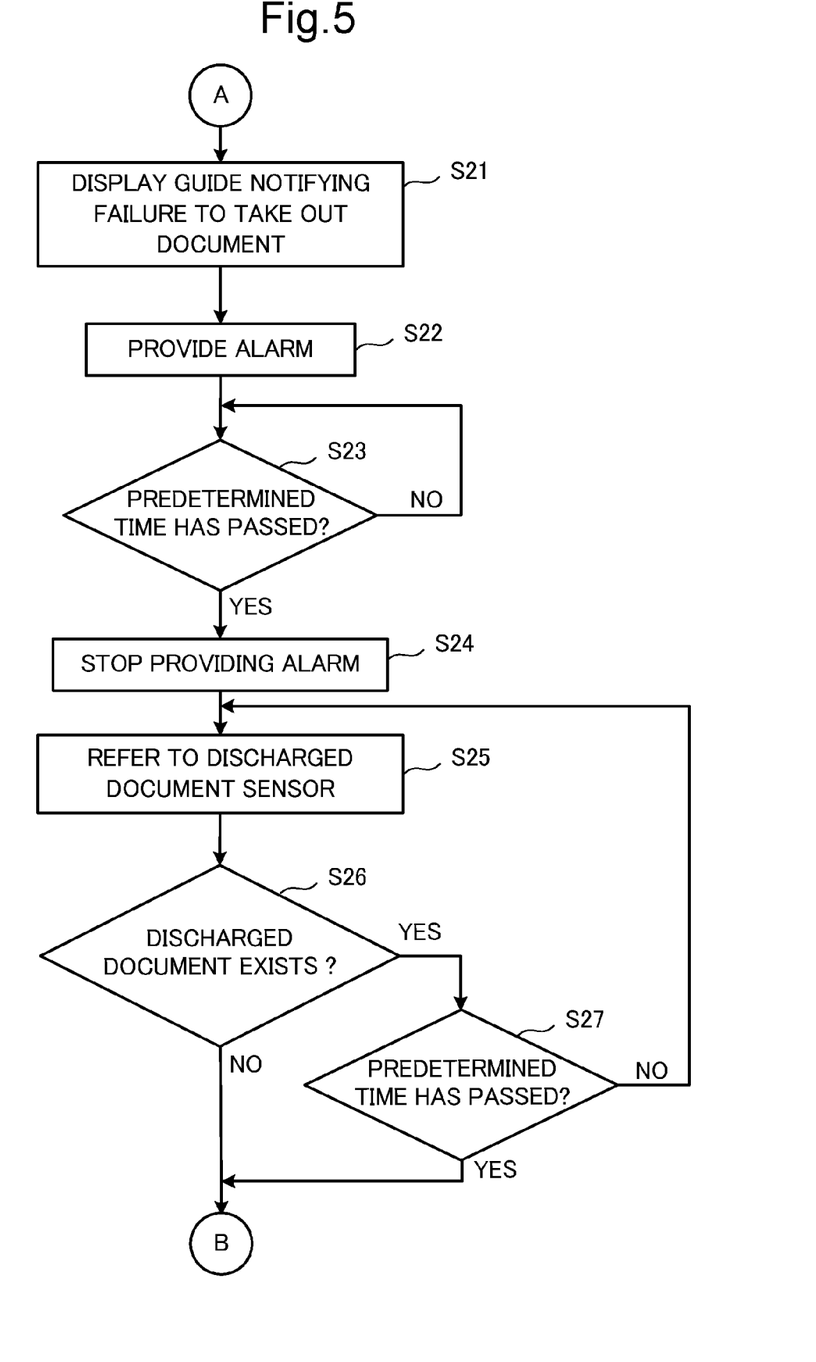
FIG. 5 is a flowchart showing alarm operation performed upon occurrence of a failure to take out a discharged document.

Next, an alarming operation performed upon occurrence of a failure to take out the discharged document will be described. FIG. 5 is a flowchart showing the alarming operation performed upon the occurrence of the failure to take out the discharged document.

Upon detection of the existence of the discharged document by the discharged document sensor 67 at a time point at which the user has ended the processing of printing the second-last-page document image without removing the discharged document (YES in S16), the control section 100 switches the display of the display section 473 to a guide indicating that a failure to take out the document has occurred (S21). Furthermore, the control section 100 performs either or both of: lighting or blinking the indicator 472; and generation of an alarm sound from the buzzer 474 (S22). As a result, the user who has viewed the display is expected to notice the failure to take-out the discharged document. This is a second action taken for preventing the user from failing to take out the discharged document.

In S16 described above, provided that it is further satisfied that reading of all the documents on the document loading base 61 of the document feed section 6 by the document reading section 5 has ended, the control section 100 may switch the display of the display section 473 to the guide indicating that a failure to take out the document has occurred (S21), and may continue to perform processing of S22 beyond.

However, to avoid endless, continuous ringing of the alarm sound, the control section 100 stops the alarm sound from the buzzer 474 (S24) after passage of predefined time (for example, one minute) since start of the alarm sound (YES in S23). The indicator 472 may continuously light up or blink.

Upon stop of the alarming, the control section 100 refers to the signal of the discharged document sensor 67 again (S25). When the user has noticed the alarming and has removed the discharged document, the discharged document sensor 67 does not detect the existence of the discharged document at this time point (NO in S26). In this case, the control section 100 restarts the image formation of the last-page document image. Specifically, the control section 100 erases the display of the display section 473 (S17), and reads out the last-page document image from either or both of the image memory 32 and the HDD 92 (S18). The image formation section 12 forms a toner image of the read last-page document image and transfers the toner image onto the paper P, and the fixing section 13 performs fixing processing on the paper P on which the toner image has been transferred (S19). Then the operation of printing the document image read by using the ADF ends.

On the other hand, when the user has failed to take out the discharged document, the discharged document sensor 67 detects the existence of the discharged document at a time point at which the alarming has stopped (YES in S26). In this case, the control section 100 continuously stops the image formation of the last-page document image.

Note that, however, there is a risk that endlessly stopping the image formation of the last-page document image may lead to a trouble in execution of a different print job. Thus, the control section 100 continuously monitors presence or absence of the existence of the document image with reference to the signal of the discharged document sensor 67 during predefined time (for example, five minutes) (NO in S27), and erases the display of the display section 473 (S17) after passage of the predefined time (YES in S27). Then the control section 100 causes the image formation section 12 to restart the image formation of the last-page document image (S18, S19). That is, even when the user fails to take out the discharged document, the image formation of the last-page document image is forcibly restarted. As a result, the operation of printing the document image read by using the ADF ends, making it possible to execute a different print job.

To stop the image formation of the last-page document image, the control section 100 preferably conveys the next paper P to a registration roller 193 located upstream of the image formation section 12 by a conveyance mechanism including the conveyance roller pair 19 and the conveyance path 190, and puts the paper P on standby. As a result, upon removal of the discharged document while stopping the image formation of the last-page document image, printing of the last-page document image can be performed in short time immediately after a time point at which the paper has been removed.

As described above, according to this embodiment, the user is requested at two stages to remove the discharged document, and especially in the second stage, upon a failure to remove the discharged document even after generation of the second alarming, the last-page document image is not printed. This can make the user notice the failure to take out the document, preventing the failure to take out the document discharged from the ADF. That is, with the image forming apparatus 1 according to this embodiment, the failure to take out the document discharged from the automatic document feed device can be prevented.

For example, the ADF may be used to copy a large volume of documents in an office or the like in some cases. In this case, the user sets the large volume of documents on the ADF and starts copying, and upon end of the copying, grasps printed matters and leaves the image forming apparatus. At this point in time, when he or she fails to take out any document discharged from the automatic document feed device, he or she is required later to return to the image forming apparatus to take out the document, which puts more loads on the user.

The technology shown in BACKGROUND refers to a technology related to the failure to take out a document upon image reading after only one document is located on a document base, and is not directly applicable to prevention of the failure to take out any document discharged from the automatic document feed device. Therefore, there have been demands for a technology of preventing the failure to take out any document discharged from the automatic document feed device.

On the contrary, according to this embodiment, as described above, it is possible to prevent the failure to take out any document discharged from the document feed section 6.

Note that this disclosure is not limited to the embodiment described above, and various modifications thereto can be made. In the embodiment described above, the timing at which the control section 100 refers to the signal of the discharged document sensor 67 is defined as when the processing of printing the second-last-page document image has ended, but this disclosure is not limited thereto. It is also possible to define the timing at which the signal of the discharged document sensor 67 is referred to as when the printing of the document image several pages before the last page has ended. That is, it is possible to appropriately change a predefined number of pages traced back from the last page.

Moreover, in the embodiment described above, the description has been given, referring to the multifunction peripheral as one embodiment of the image forming apparatus according to this disclosure, but this is just one example, and for example, a different image forming apparatus such as a copier may also be used.

Moreover, the configuration and the processing shown by the embodiment described above with reference to FIGS. 1 through 5 are just one embodiment of this disclosure, and this disclosure is not limited in any way to the configuration and processing described above.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
   a document feed section individually feeding loaded documents;
   a document reading section optically reading an image of the document fed by the document feed section;
   a discharged document sensor detecting an existence of a discharged document already read by the document reading section;
   an image storage section storing a document image obtained through the reading by the document reading section;
   an image formation section performing an image formation operation in which a toner image of the document image stored in the image storage section is formed on paper;
   a fixing section performing fixing processing of heating and pressurizing the paper on which the toner image has been formed by the images formation section to fix the toner image on the paper; and
   a control section performing control of, upon judgment with reference to a signal of the discharged document sensor that the discharged document exists at time of ending image formation of up to a predefined number of pages traced back from a last page of a plurality of number of pages of document images stored in the image storage section, stopping the image formation operation performed by the image formation section and causing the image formation section not to perform the image formation of the predefined number of pages of document images.

2. The image forming apparatus according to claim 1, wherein
   upon judgment with reference to the signal of the discharged document sensor that the discharged document has been removed during the stopping of the image formation of the predefined number of pages of document images, the control section causes the image formation section to restart the image formation of the predefined number of pages of document images.

3. The image forming apparatus according to claim 2, wherein
   upon passage of predefined time since the stopping of the image formation of the predefined number of pages of document images, the control section causes the image formation section to restart the image formation of the predefined number of pages of document images even in a state in which it is not judged that the discharged document has been removed.

4. The image forming apparatus according to claim 1, further comprising
   a conveyance mechanism conveying the paper, wherein
   to stop the image formation of the predefined number of pages of document images, the control section causes the conveyance mechanism to convey next paper to a registration roller located on an upstream side of the image forming apparatus and to put the paper on standby.

5. The image forming apparatus according to claim 1, comprising
   an alarming section providing an alarm through at least one of an alarm lamp and an alarm sound, wherein
   the control section causes the alarming section to provide the alarm to stop the image formation of the predefined number of pages of the document images.

6. The image forming apparatus according to claim 5, wherein
   the control section causes the alarming section to stop the providing of the alarm after passage of predetermined time since start of the providing of the alarm.

7. The image forming apparatus according to claim 1, wherein
   upon the judgement as a result of the reference to the signal of the discharged document sensor that the discharged document exists at time of ending the image formation of up to the predefined number of pages traced back from the last page, and further when a condition that reading of all documents by the document reading section has ended is satisfied, the control section performs control for stopping the image formation operation performed by the image formation section and causing the image formation section not to perform the image formation for the predefined number of pages of document images.

8. The image forming apparatus according to claim 1, further comprising
   a display section, wherein
   upon start of the document reading by the document reading section, the control section provides, at the display section, a request display requesting for removal of the discharged document after completion of the document reading, and erases the request display upon judgement that no discharged document exists before the image formation of the predefined number of pages of document images, and switches the display of the display section to a display notifying a failure to take out the discharged document upon judgement that the discharged document exists.

* * * * *